March 20, 1956
H. GALLUSSER
2,739,055
METHOD AND APPARATUS FOR REDUCING
IRON ORES BY MEANS OF METHANE GAS
Filed Jan. 29, 1953
3 Sheets-Sheet 2
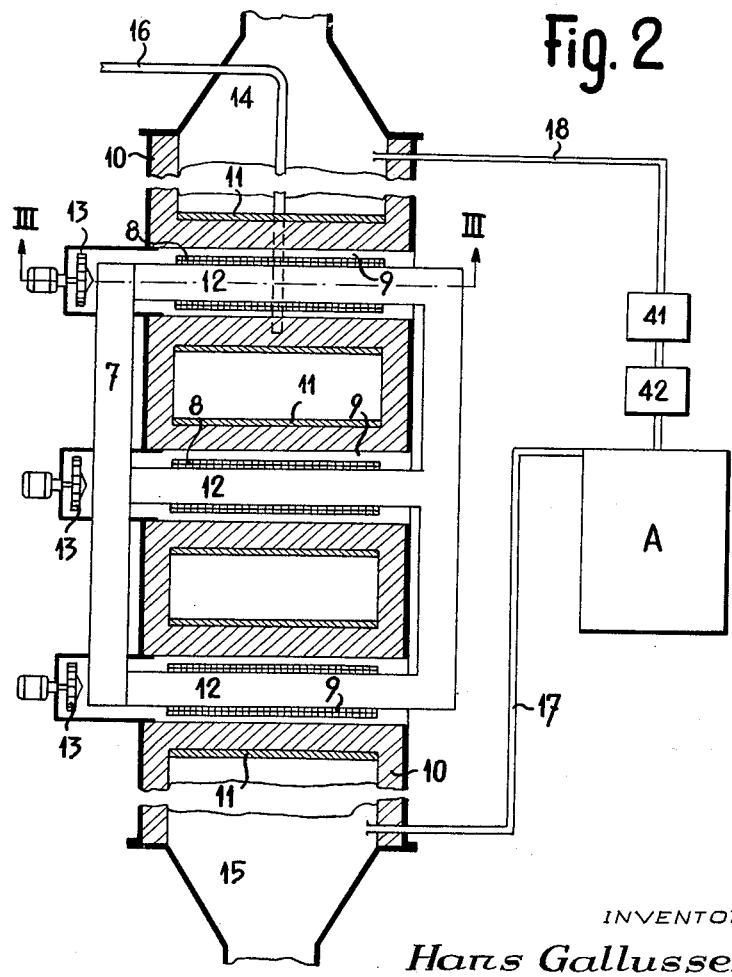
INVENTOR
*Hans Gallusser.*
BY *Emery L. Groff*
ATTORNEY March 20, 1956
H. GALLUSSER
2,739,055
METHOD AND APPARATUS FOR REDUCING
IRON ORES BY MEANS OF METHANE GAS
Filed Jan. 29, 1953
3 Sheets-Sheet 3
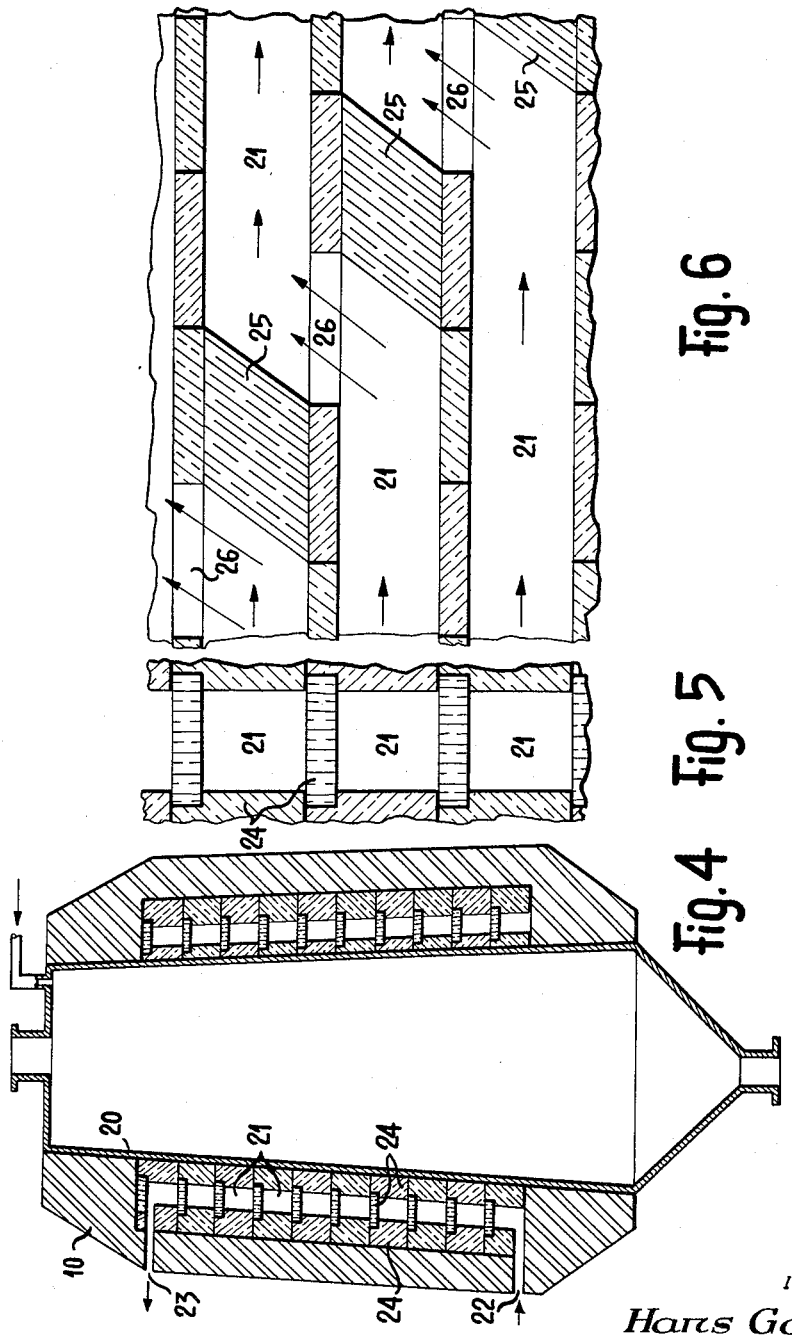
INVENTOR
*Hans Gallusser.*
BY
ATTORNEY

United States Patent Office 2,739,055
Patented Mar. 20, 1956

2,739,055

METHOD AND APPARATUS FOR REDUCING IRON ORES BY MEANS OF METHANE GAS

Hans Gallusser, Geneva, Switzerland, assignor to Ateliers Des Charmilles S. A., Geneva, Switzerland, a company of Switzerland Application January 29, 1953, Serial No. 333,860

Claims priority, application Switzerland March 17, 1952

8 Claims. (Cl. 75—13)

Various methods of reducing iron ores in a shaft or stack-type furnace by means of methane, in which the heat necessary for the reduction is supplied to the furnace from an outside source, are already known. Such a process, for example, is described in U. S. Patent No. 2,144,618. According to that process, cold methane is fed into the lower part of a shaft furnace. In the lower hot zone of the furnace, which is heated by electrical high-frequency means in the presence of metallic iron acting as a catalyst, the methane is decomposed into $H_2$ and C. The carbon is deposited on the iron, whereas the hydrogen flows farther upward in the furnace where it reduces the iron ores to iron.

Furthermore, methane is introduced through the upper part of the furnace and conducted as far as the lower part of the zone which is heated by the high-frequency means. There, the methane is brought into contact with the reduced ore and decomposed into $H_2$ and C through the effect of the iron as a catalyst, whereupon the $H_2$ flows upward through the furnace body while the carbon precipitates on the iron.

In practice, the process outlined above has the following disadvantages:

(1) The separated carbon is not used for reduction, which means a loss in efficiency.

(2) Only about ⅓ of the hydrogen formed is capable of reduction, because chemical equilibrium occurs as soon as ⅓ of the hydrogen has been converted into water vapor as a result of reduction at a reduction temperature of 800–1000° C., so that there can be no further reduction. The other ⅔ of the hydrogen formed leaves the furnace without participating in the reduction.

(3) The furnace is heated by electrical high-frequency means. Such heating is extremely uneconomical inasmuch as the standard electric energy of 50 to 60 cycles must be transformed into energy of 5,000–10,000 cycles. This type of heating, moreover, is of low efficiency.

The general object of the present invention is the utilization of both components of the methane, namely, C and $H_2$, for reduction purposes and is based on the principle that, at high temperatures, methane is decomposed by water vapor into CO and $H_2$ in accordance with the equation $CH_4+H_2O=CO+3H_2-49$ K cal., both of these gases being excellent reducing gases for changing oxide into iron.

According to the present invention, the methane or the methane-containing gases as well as the ore to be reduced, are heated together in a shaft furnace in known manner by a special heating system to the decomposition or reduction temperature. However, the process of the present invention differs from the known processes in that the waste gases, freed from water vapor and $CO_2$, are again supplied alone into the furnace below the reduction zone and the methane or the methane-containing gases are fed through a special conduit into the upper part of the reduction zone of the furnace where they mix with the water vapor which has formed in the lower reduction zone through the reduction of the iron ore by hydrogen.

The aforementioned cleansed waste gases will hereinafter be referred to as circulating gases.

In prior processes, the separation of carbon in the lower part of the furnace is due to the fact that the methane is fed into that part of the furnace where the iron oxides have already been reduced to iron so that water vapor can no longer form, with the result that the methane is decomposed into $H_2$ and C under the influence of the high temperature.

According to the present invention, the separation of carbon is prevented by the fact that, through a special conduit and preferably at a high rate of speed, the methane is supplied into the upper part of the reduction zone which is heated by the aforementioned special heating system and where, and only then, it is mixed with the circulating gas which already contains sufficient water vapor that has formed through reduction in the lower part of the reduction zone.

The accompanying drawings show diagrammatically and by way of example some embodiments of apparatus designed to carry the process into practice.

Figure 2 is a longitudinal section through an electric furnace.

Figure 3 is a section along line III—III of Figure 2.

Figure 4 is a longitudinal section through a furnace heated by gas supplied from the outside.

Figures 5 and 6 are enlarged detail views of fragmentary portions.

Figure 1:
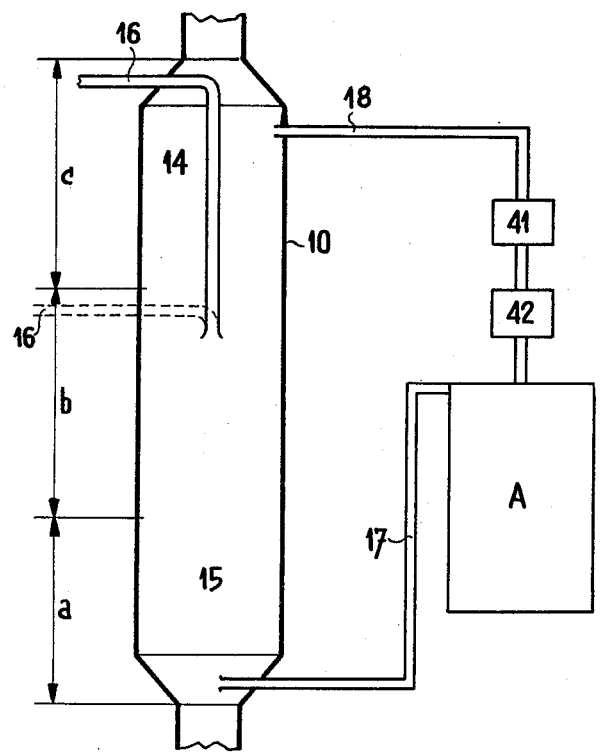
Figure 1 is a diagrammatic sketch of a typical installation.

In Figure 1, the furnace body of a shaft furnace 10 is shown diagrammatically, the mid-section of the furnace being provided with a special heating system by means of which the heat necessary for attaining the decomposition or reduction temperature of 800°–1000° C. is produced and kept constant. The furnace has three principal zones, as shown in Figure 1, namely, the lower zone a, the middle or heating zone b, and the lower zone c. Reduction of the iron ores takes place in zone b and will, therefore, hereinafter be referred to as the reduction zone. The heating system may be either of the electric resistance or induction heating or gas heating type.

Above and below the reduction zone b are substantially large spaces 14 and 15 respectively. In space 14 the hot gases heat the incoming cold ores, whereas in space 15 the hot reduced ores are cooled by the inflowing cold circulating gases. Spaces 14 and 15 are in communication with inlet and discharge arrangements (not shown) for the ores, but which are well known to the art.

The drawing shows diagrammatically how the methane or the methane-containing gases are fed into the furnace with a view to preventing the separation of carbon.

The methane or the methane-containing gases are introduced into the upper part of the reduction zone b by means of a conduit 16 extending through the upper part or zone c of the furnace. This may extend, alternatively, laterally into the heating zone b, as shown on the drawing in dotted lines.

An outlet conduit 18 communicates with the upper part 14 of the furnace. This conduit serves for the removal, by suction, of the waste gases. After treatment, for the purpose of removing the water vapor and the $CO_2$, the remaining $H_2$ and CO gases, hereinafter termed circulating gases, are fed again or recycled into the lower part 15 of the furnace through an inlet conduit 17.

The furnace operates as follows:

The cold circulating gas, consisting of $H_2$ and CO, is warmed in the lower zone a by the reduced hot ores coming from the reduction zone b, as a result of which the ores are correspondingly cooled.

Reduction of the iron ores begins in the lower part of the zone b jointly with the formation of water vapor and $CO_2$. The methane must now enter the reduction zone $b$ at that place where there is already sufficient water vapor in the circulating gas to decompose the incoming methane into $CO$ and $H_2$. These newly formed gases participate in the reduction until chemical equilibrium is established between $H_2$, $H_2O$, $CO$ and $CO_2$. Before leaving the furnace, these gases heat the incoming ores and are correspondingly cooled in giving up their heat for this purpose. The reduction gases are sucked from the upper part 14 of the furnace by a compressor 41 through conduit 18 and passed into a cooler 42, whereby the water formed by the reduction is condensed. Following separation of the water, the gases are treated in known manner in a washing plant A for the purpose of removing the existing $CO_2$ and thereby concentrating the H and CO. The remaining cold gases $H_2$ and CO in the purified state are recycled into the lower part 15 of the furnace through the conduit 17. By this method it is possible to use for reduction not only the hydrogen of the methane but also the carbon in the form of CO, inasmuch as the carbon is converted into CO by the water vapor as a result of reduction with hydrogen.

In Figures 2 and 3, the body of the shaft furnace 10 is provided with an electrical induction heating system comprising a standard transformer with closed iron core built into the furnace. The numeral 7 designates the magnet frame and 8 the primary windings of a 3-phase transformer.

The three arms 12 of the magnet frame extend through the furnace body within adequately large ducts so that an air gap 9 remains between the windings 8 and the furnace body. As apparent from the drawing, those parts of the furnace body which are traversed by the arms 12 of the transformer are each surrounded by an insulated metal cylinder 11. These cylinders form the secondary windings of the transformer.

A ventilator or fan 13 is provided at one end of each enveloped arm 12. Through air gap 9 this ventilator removes the heat generated by the primary windings 8 as well as the heat flowing from the secondary windings 11 inward.

In all other respects, the arrangement of the installation is the same as that described in connection with Figure 1. Its mode of operation is also the same.

This heating system is far more efficient than high-frequency heating. The degree of efficiency of a transformer of the type described amounts to about 97 percent where the cosine of the phase angle between voltage and current, or power factor, lies between 0.85 and 0.9. This type of heating with standard electric energy of 50 to 60 cycles affords maximum heating effect.

Where an inexpensive heating gas, such as natural gas or coke-oven gas, for instance, is available, the reduction furnace may be supplied with the necessary heat also from an outside source through the combustion of such gases. An example of an installation of this type is shown in Figs. 4 to 6.

In this case, the furnace body 10 comprises a material possessing high insulating properties in order to keep the heat losses of the furnace down to a minimum. The inner furnace wall comprises a heat-resisting metal cylinder 20, a portion of the length of which is surrounded by a gas heating system. This heating system comprises a tier of annular mutually connected ducts 21 which are in communication with a gas inlet 22 and a gas outlet 23 for hot combustion gases. The heating system may comprise bricks 24 of material having high heat conductive properties such as magnesite bricks, for instance, to transmit and give off to the adjoining walls of the cylinder 20 the heat produced by the combustion of the gas and, at the same time, protect that wall against attack by combustion gases.

As shown in Figures 5 and 6, each of the superposed annular ducts 21 is sealed at one point by a wall or baffle 25, whereas an aperture 26 next to that wall connects the duct with the ducts directly above and underneath it, so that the heating gases fed into the lowermost duct must successively flow through all annular ducts.

Ducts 21 may also be slightly inclined and form a spiral or helical pattern between gas inlet 22 and gas outlet 23.

I claim:

1. The method of reducing iron oxide in a vertical stack type furnace, consisting essentially of electrically heating the iron oxide in the presence of substantially pure hydrogen and substantially pure carbon monoxide at a reduction temperature in an intermediate part of said furnace, reacting gases evolving from the reduction reaction, which gases will include steam as a product of the reduction of iron oxide with hydrogen, with methane gas to form hydrogen and carbon monoxide, said methane gas being introduced in the upper part of said intermediate part of said furnace, purifying the evolving gases to concentrate the hydrogen and carbon monoxide content thereof, and recycling the purified gas alone for reaction with the iron oxide, below said intermediate part.

2. The method of reducing iron oxide in a vertical stack type furnace, consisting essentially of electrically heating the iron oxide in the presence of substantially pure hydrogen and substantially pure carbon monoxide at a reduction temperature in an intermediate part of said furnace, reacting gases evolving from the reduction reaction, which gases will include steam as a product of the reduction of iron oxide with hydrogen admixed with carbon dioxide, with methane gas to form hydrogen and carbon monoxide, said methane gas being introduced in the upper part of said intermediate part of said furnace, removing carbon dioxide and water from the resulting gaseous mixture and recycling it alone for reaction with the iron oxide, below said intermediate part.

3. The method of reducing iron oxide in a vertical stack type furnace, consisting essentially of electrically heating the iron oxide in the presence of substantially pure hydrogen and substantially pure carbon monoxide at a temperature in the range of about 800° to 1000° C., in an intermediate part of said furnace, reacting gases evolving from the reduction reaction, which gases will include steam as a product of the reduction of iron oxide with hydrogen admixed with carbon dioxide, with methane gas to form hydrogen and carbon monoxide, said methane gas being introduced in the upper part of said intermediate part of said furnace, removing carbon dioxide and water from the resulting gaseous mixture and recycling it alone for reaction with the iron oxide, below said intermediate part.

4. Apparatus for reducing iron oxide comprising a vertical stack type furnace having an upper zone, a lower zone and an intermediate zone, said zones being adapted to be charged with iron oxide to be reduced, means for electrically heating said intermediate zone to the reduction temperature, said furnace having a first gas inlet leading to the upper part of said intermediate zone, said inlet being adapted to conduct methane gas to the furnace from an external source of supply, a gas outlet at the top of said upper zone and above said first gas inlet, a second gas inlet at the bottom of said lower zone, and a gas pump and gas purification means connected between said outlet and said second gas inlet, said means being operative to continuously concentrate hydrogen and carbon monoxide components of a gaseous medium containing said components in a diluted form.

5. Apparatus for reducing iron oxide comprising a vertical stack type furnace having an upper zone, a lower zone and an intermediate zone, said zones being adapted to be charged with iron oxide to be reduced, means for electrically heating said intermediate zone to the reduction temperature, said furnace having a first gas inlet leading to the upper part of said intermediate zone, said inlet being adapted to conduct methane gas to the furnace from an external source of supply, a gas outlet at the top of said upper zone and above said first gas inlet, a second gas inlet at the bottom of said lower zone, means for pumping gases from said outlet to said second inlet, and means for removing carbon dioxide and water from said pumped gases before re-entering the furnace through said second gas inlet.

6. Apparatus as defined by claim 5 in which the heating means is of the electrical induction type and having a transformer, said transformer having a closed iron core within the furnace and having its secondary winding integral with the wall of the furnace.

7. Apparatus as defined by claim 5 in which the heating means comprises a tier of ducts surrounding the wall of the furnace, and means for serially conducting hot gases through said ducts.

8. The method of reducing iron oxide in a stack type furnace, said method consisting essentially of electrically heating an intermediate zone of the furnace to a temperature of about 800° to 1000° C., passing iron oxide to be reduced from an upper zone of the furnace downwardly through the intermediate zone and thence passing iron reduced in the intermediate zone through a bottom zone of the furnace, passing upwardly through the bottom zone a cold gaseous mixture of substantially pure hydrogen and substantially pure carbon monoxide, whereby the reduced iron is cooled by the gaseous mixture and the gaseous mixture is heated without substantial chemical change therein, passing the hot gaseous mixture upwardly through the intermediate zone to react with the heated oxide and effect reduction thereof with formation of water and carbon dioxide, introducing methane gas into the upper part of the intermediate zone to react with a portion of the formed water and carbon dioxide to form hydrogen and carbon monoxide, removing excess water, carbon dioxide, hydrogen and carbon monoxide as a gaseous mixture from the top of the intermediate zone, treating the removed gaseous mixture to eliminate water and carbon dioxide, said treatment including cooling, whereby a cold mixture of substantially pure hydrogen and substantially pure carbon monoxide obtains, and recycling the latter cold mixture by introducing it at the bottom of the lower zone of the furnace.

References Cited in the file of this patent

UNITED STATES PATENTS

| | | |
|---|---|---|
| 1,645,968 | Percy | Oct. 18, 1927 |
| 2,048,112 | Gahl | July 21, 1936 |